US 6,611,379 B2

(12) United States Patent
Qian et al.

(10) Patent No.: US 6,611,379 B2
(45) Date of Patent: Aug. 26, 2003

(54) BEAM SPLITTER AND METHOD FOR GENERATING EQUAL OPTICAL PATH LENGTH BEAMS

(75) Inventors: Shinan Qian, Upton, NY (US); Peter Takacs, Riverhead, NY (US)

(73) Assignee: Brookhaven Science Associates LLC, Upton, NY (US)

( * ) Notice: Subject to any disclaimer, the term of this patent is extended or adjusted under 35 U.S.C. 154(b) by 0 days.

(21) Appl. No.: 09/768,597

(22) Filed: Jan. 25, 2001

(65) Prior Publication Data

US 2002/0135779 A1 Sep. 26, 2002

(51) Int. Cl.[7] .......................... G02B 27/10; G03B 21/26
(52) U.S. Cl. ....................... 359/618; 359/629; 359/637; 353/35
(58) Field of Search ................................. 359/618, 629, 359/634, 637, 583, 639, 640; 353/35; 348/337

(56) References Cited

U.S. PATENT DOCUMENTS

| | | | |
|---|---|---|---|
| 2,432,432 A | 12/1947 | MacNeille | 356/13 |
| 2,472,600 A | 6/1949 | Luboshez | 359/638 |
| 3,958,884 A | 5/1976 | Smith | 356/106 R |
| 4,498,773 A | 2/1985 | von Bieren | 356/360 |
| 4,743,118 A | 5/1988 | Tsuchiya et al. | 356/353 |
| 4,758,089 A | 7/1988 | Yokokura et al. | 356/348 |
| 4,776,699 A | 10/1988 | Yoshizumi | 356/349 |
| 4,783,170 A | 11/1988 | Bergstrom | 356/350 |
| 4,812,042 A | 3/1989 | Yokokura et al. | 356/348 |
| 4,884,697 A | 12/1989 | Takacs et al. | 356/360 |
| 4,896,952 A * | 1/1990 | Rosenbluth | 359/638 |
| 5,002,365 A | 3/1991 | DeJager et al. | 359/618 |
| 5,067,817 A | 11/1991 | Glenn | 356/376 |
| 5,080,490 A | 1/1992 | Manhart | 356/351 |
| 5,220,406 A | 6/1993 | Kishner | 356/360 |
| 5,260,761 A | 11/1993 | Barker | 356/4.5 |
| 5,325,175 A | 6/1994 | Mocker et al. | 356/351 |
| 5,424,829 A | 6/1995 | Sato et al. | 356/356 |
| 5,446,710 A | 8/1995 | Gardner et al. | 369/44.14 |
| 5,467,191 A | 11/1995 | Kishner | 356/360 |
| 5,548,403 A | 8/1996 | Sommargren | 356/354 |
| 5,644,432 A | 7/1997 | Doany | 359/634 |
| 5,668,674 A | 9/1997 | Kanai et al. | 359/835 |
| 5,808,739 A | 9/1998 | Turner et al. | 356/346 |
| 5,883,746 A | 3/1999 | Zelenka | 359/629 |
| 5,933,236 A | 8/1999 | Sommargren | 356/354 |
| 6,429,906 B1 * | 8/2002 | Sekine et al. | 349/9 |

OTHER PUBLICATIONS

K. von Bieren, "Interferometry of wave fronts reflected off conical surfaces," *Applied Optics*, vol. 22, No. 14, at pp. 2109–2114, 1983.

Takacs et al., "Design of a long trace surface profiler," *Figure and Finish*, SPIE vol. 749, at pp. 59–64, 1987.

Takacs, et al., "Improvements in the accuracy and the repeatability of long trace profiler measurements", *Applied Optics*, Vo. 38, No. 25, 1999.

Qian et al. "Sub–μrad angular stability measurements by use of Long–Trace–Profiler–based systems", *SPIE*, vol. 3773, 1999.

Qian, et al., "Precise angle monitor based on the concept of pencil–beam interferometry", *SPIE*, vol. 4101, 2000.

* cited by examiner

*Primary Examiner*—Ricky Mack
(74) *Attorney, Agent, or Firm*—Margaret C. Bogosian (57) ABSTRACT

The present invention is a beam splitter for splitting an incident beam into first and second beams so that the first and second beams have a fixed separation and are parallel upon exiting. The beam splitter includes a first prism, a second prism, and a film located between the prisms. The first prism is defined by a first thickness and a first perimeter which has a first major base. The second prism is defined by a second thickness and a second perimeter which has a second major base. The film is located between the first major base and the second major base for splitting the incident beam into the first and second beams. The first and second perimeters are right angle trapezoidal shaped. The beam splitter is configured for generating equal optical path length beams.

15 Claims, 5 Drawing Sheets

BEAM SPLITTER AND METHOD FOR GENERATING EQUAL OPTICAL PATH LENGTH BEAMS

This invention was made with Government support under contract number DE-AC02-98CH10886, awarded by the U.S. Department of Energy. The Government has certain rights in the invention.

BACKGROUND OF THE INVENTION

The present invention relates generally to a beam splitter and method for generating equal optical path length beams for interferometry and other metrology applications. More particularly, the present invention is primarily directed to a beam splitter that has a monolithic structure and exhibits improved stability. The invention is particularly useful for generating parallel beams with a well defined lateral separation for a variety of applications including: surface profiling, precise angle monitoring, pencil beam interferometer and shearing interferometry.

Devices for generating parallel pencil beams are well known in the art. U.S. Pat. No. 4,498,773 to von Bieren discloses an interferometer which measures optical surfaces through the interference of two pencil beams which are reflected off an optical surface. The interferometer includes a laser for generating a laser beam which is split into two parallel beams by a beam splitter and a mirror. The two pencil beams are reflected off a second beam splitter through an alignment invariant optical device and onto the optical surface to be measured. The two pencil beams are reflected and back-trace through the alignment invariant optical device, propagate through the second beam splitter and enter an optical lens. The optical lens focuses the two beams in its back focal plane where the interference of the two pencil beams takes place. This information is then relayed through an optical spatial filter and optional micro objective into a readout section.

U.S. Pat. No. 4,884,697, which issued to the same inventors of the present invention and is commonly assigned, discloses a long-trace surface profiler for non-contact measurement of surface profile, slope error and curvature on cylindrical synchrotron radiation (SR) mirrors. The optical system is based upon the concept of a pencil-beam interferometer with an inherent large depth-of-field. The optical system uses a zero-path-difference beam splitter, which separates a laser beam into two collinear, variable-separation probe beams. A linear array detector is used to record the interference fringe in the image, and analysis of the fringe location as a function of scan position allows one to reconstruct the surface profile. The optical head is mounted on an air-bearing slide with the capability to measure long aspheric optics, typical of those encountered in SR applications. The optical system also uses a transverse outrigger beam which provides information on the relative alignment of the scan axis to the cylinder optic symmetry axis. The disclosure of U.S. Pat. No. 4,884,697 is incorporated herein by reference.

U.S. Pat. No. 5,446,710 to Gardner et al. discloses a focus error detection using an equal path length lateral shearing interferometer. As shown in FIGS. 2, 5A, and 5B, the interferometer 50 includes a beam splitter 52 and two abutting roof prisms 54 and 56. The roof prisms 56, 54 can be shifted along an axis orthogonal to the direction of light propagation and to the peak of the roof creates a lateral shear between the two output beams as shown in FIG. 5A. The roof prism may also be rotated about an axis producing a tilt between the two output beams as shown in FIG. 5B. This creates an interference pattern with a rotational orientation which is a function of the focus of the beam impinging on the optical storage medium. A pattern sensor is provided to adjust the focus of the beam in an accurate and dynamic manner.

Figure 1:
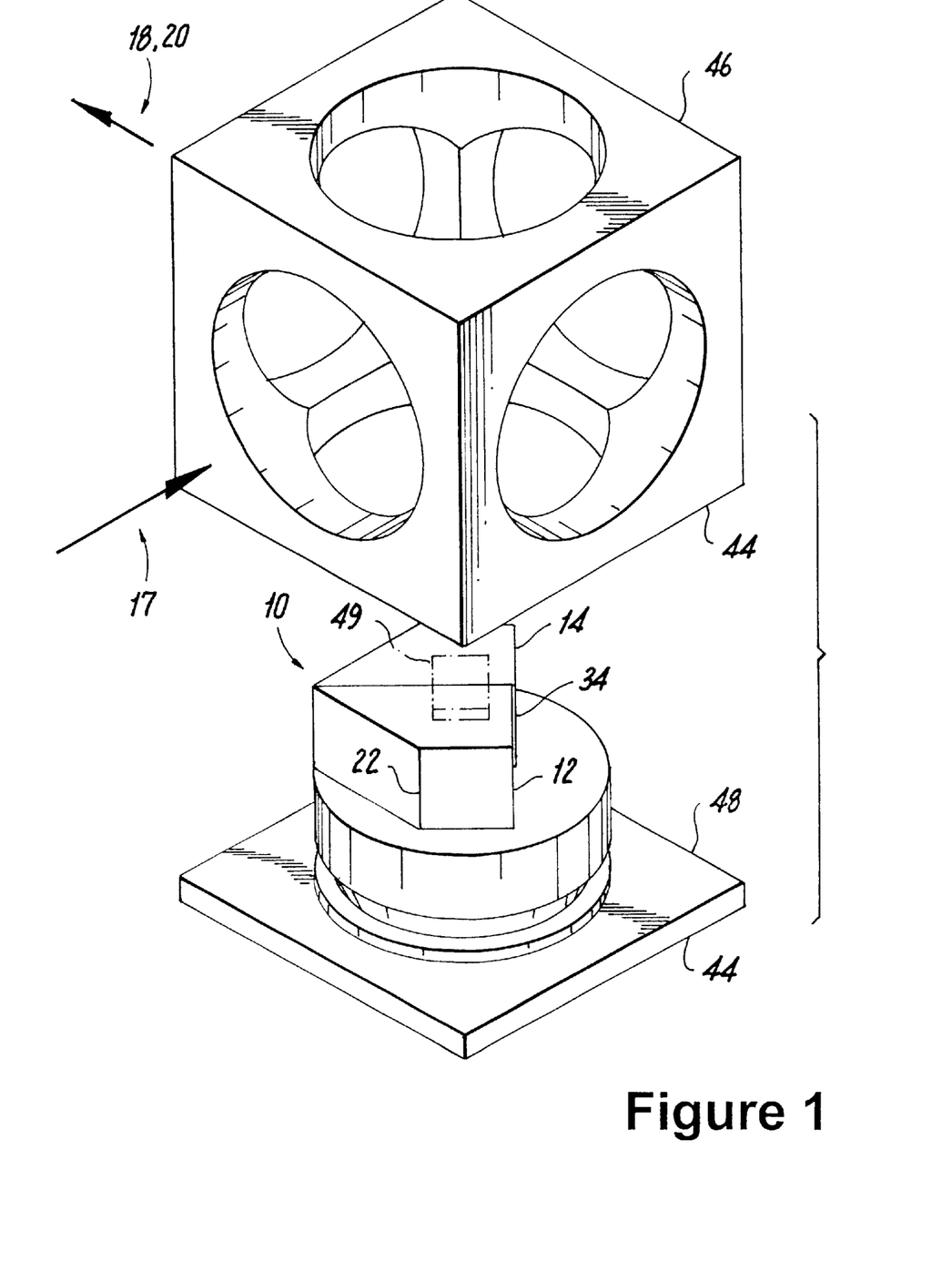
FIG. 1 is a perspective view of the beam splitter in accordance with the present invention shown in a partially exploded housing.

U.S. Pat. No. 4,783,170 to Bergstrom discloses a symmetrical prismatic readout apparatus for a ring laser gyro using a platinum beam splitter. The readout apparatus includes a pair of substantially identical prism elements 12 and 14. The prism elements have sides 16, 18, 24 and 26 that are parallel and are perpendicular to sides 20 and 28 as shown in FIG. 1. The fourth side of each prism element is oriented at a 45 degree angle with respect to the parallel sides. Both the first and second prisms 12 and 14 are substantially identical in construction and are arranged so that sides 20 and 28 are collinear. A beam splitter coating 32, 34 is applied to the fourth side 22, 30 of the prism elements 12, 14. A beam splitter 36 is also imposed at the interface between the two prisms 12 and 14. The apparatus includes a reflector element 6 having an inner surface 38 that is also a beam splitter.

U.S. Pat. Nos. 5,548,403 and 5,933,236 to Sommargren disclose phase shifting interferometers. More specifically, U.S. Pat. No. 5,548,403 discloses a phase shifting interferometer that uses a spherical wavefront generated by the process of diffraction. FIG. 1 in both of the references are the same and illustrate that which is pertinent to the present invention. In particular, the interferometers include a beam splitter 22 having a pair of fixed retroreflectors 24 and 28 arranged in a similar fashion to the cube beam splitter and right angle prisms in U.S. Pat. No. 4,884,697 discussed above.

U.S. Pat. No. 4,743,188 to Tsuchiya et al. discloses a method of detecting origin of shear and measuring amount of shear in shearing interferometer systems. Referring to FIG. 1, this patent also discloses an arrangement that is similar to the disclosure in U.S. Pat. No. 4,884,697 and includes a beam splitter 18 corner-cube prisms 20, 22. The patent also includes a pair of shutters 21, 23 located between the beam splitter 18 and the corner-cube prisms 20, 22.

The problems associated with the prior art parallel beam generators include: the prior art apparatuses are not equal optical path length apparatuses thus causing instability of the measurement produced by frequency shift of the light source, or the apparatuses are subject to thermal drift and subject to additional stability problems associated with the relative mechanical vibration and slow shifting of their optical components, or both. The present invention addresses these problems through a monolithic structural design and generation of equal optical path length beams. In addition, the beam splitter in accordance with the present invention is compact, which is advantageous in certain metrology applications.

SUMMARY OF THE INVENTION

The present invention is a beam splitter for splitting an incident beam into first and second beams so that the first and second beams have a equal optical path length, fixed lateral separation, and are parallel upon exiting. The beam splitter includes a first prism, a second prism, and a film located between the prisms. The first prism is defined by a first thickness and a first perimeter which has a first major base. The second prism is defined by a second thickness and a second perimeter which has a second major base. The film is located between the first major base and the second major base for splitting the incident beam into the first and second beams.

In a preferred embodiment, the first and second perimeter are trapezoidal shaped. In this embodiment, the first perimeter also includes a first minor base, a first reflecting side, and a first nonreflecting side. The first reflecting side preferably forms a right angle with the first major base. Similarly, the second perimeter includes a second minor base, a second reflecting side, and a second nonreflecting side. The second reflecting side preferably forms a right angle with the second major base. Preferably the first nonreflecting side intersects the first major base a 45 degree angle and the second nonreflecting side intersects the second major base at a 45 degree angle. Preferably the first nonreflecting side and the second nonreflecting side are arranged to intersect at a right angle. Preferably the first major base is shorter than the second major base and the film has ratio of 1:1 between transmissivity and reflectivity after gluing.

In accordance with the present invention a method of generating beams includes providing a beam splitter and directing an incident beam at the beam splitter. The beam splitter includes trapezoidal shaped first and second prisms and a film located between the prisms. The incident beam is directed at the first nonreflecting side of the beam splitter so that the incident beam splits into first and second beams at the film. The incident beam is perpendicular to the first nonreflecting side of the prism. The first beam reflects within the first prism, passes through the film and out the second nonreflecting side. The second beam reflects within the second prism, reflects off the film to exit through the second nonreflecting side. The first and second beams are parallel and have a equal optical path length.

The second beam can be perpendicular to the nonreflecting side of said second trapezoid. The first beam can be perpendicular to nonreflecting side of said second trapezoid.

In accordance with the present invention a method of generating equal optical path length beams includes providing a beam splitter described above and providing particularly defining the configuration 2M=2A+B of the beam splitter so that the split beams have an equal optical path length, fixed lateral separation, and are parallel upon exiting.

In accordance with the present invention an interferometer for profiling the surface along one axis of an optical surface includes an incident light beam, a first beam splitter, a second beam splitter, and an image generator. The first beam splitter includes trapezoidal shaped first and second prisms and a film located between the prisms. The first beam splitter is optically oriented to receive the incident light beam at the first nonreflecting side so that the incident beam splits into first and second beams at the film. The first beam reflects within the first prism, passes through the film and out the second nonreflecting side. The second beam reflects within the second prism, reflects off the film to exit through the second nonreflecting side. With the particular configuration condition 2M=2A+B the first and second beams are parallel and have a equal optical path length while being laterally displaced from each other along the axis. The second beam splitter receives the first and second beams from the first beam splitter and passes the beams through toward the optical surface. The optical surface is oriented to reflect the first and second beams back to the second beam splitter. The second beam splitter redirects the reflected first and second beams toward the image generator which forms the profile of the optical surface. Preferably the second beam splitter is a cube and the incident light beam is a laser beam.

As a result of the present invention, a method and apparatus for generating equal optical path length beams with fixed separation and parallel upon exiting for interferometry is provided. The primary advantage of the present invention when compared with the prior art is the increase in stability due to the monolithic construction of the beam splitter combined with equal optical path length beams. In addition, the present invention provides for a compact design that is advantageous in certain metrology applications.

Using the inventor's prior patent, U.S. Pat. No. 4,884,697, as a point of reference, the monolithic construction increases stability by eliminating the following:

1. Relative vibration of beam splitter 24 and the right angle prisms 26 and 28 (See FIG. 1 of '697 reference);
2. Air turbulence in the air gap between the component parts;
3. Displacement problems associated with adjustment requirements; and
4. Thermal induced errors because there is now a small temperature gradient in the monolithic beam splitter.

The beam splitter of the present invention provides stability of non-reference subtraction having a slope drift as low as 0.6 micro rad rms in a thermal environment of plus or minus 0.5 degrees Celsius in 15 hours whereas the prior art had a slope drift as high as 15 micro rads rms in a plus or minus 0.1 degree Celsius environment in 10 hours.

For a better understanding of the present invention, reference is made to the following description to be taken in conjunction with the accompanying drawings and its scope will be pointed out in the appended claims.

BRIEF DESCRIPTION OF THE DRAWINGS

Preferred embodiments of the invention have been chosen for purposes of illustration and description and are shown in the accompanying drawings, wherein.

DETAILED DESCRIPTION OF THE INVENTION

Figure 2:
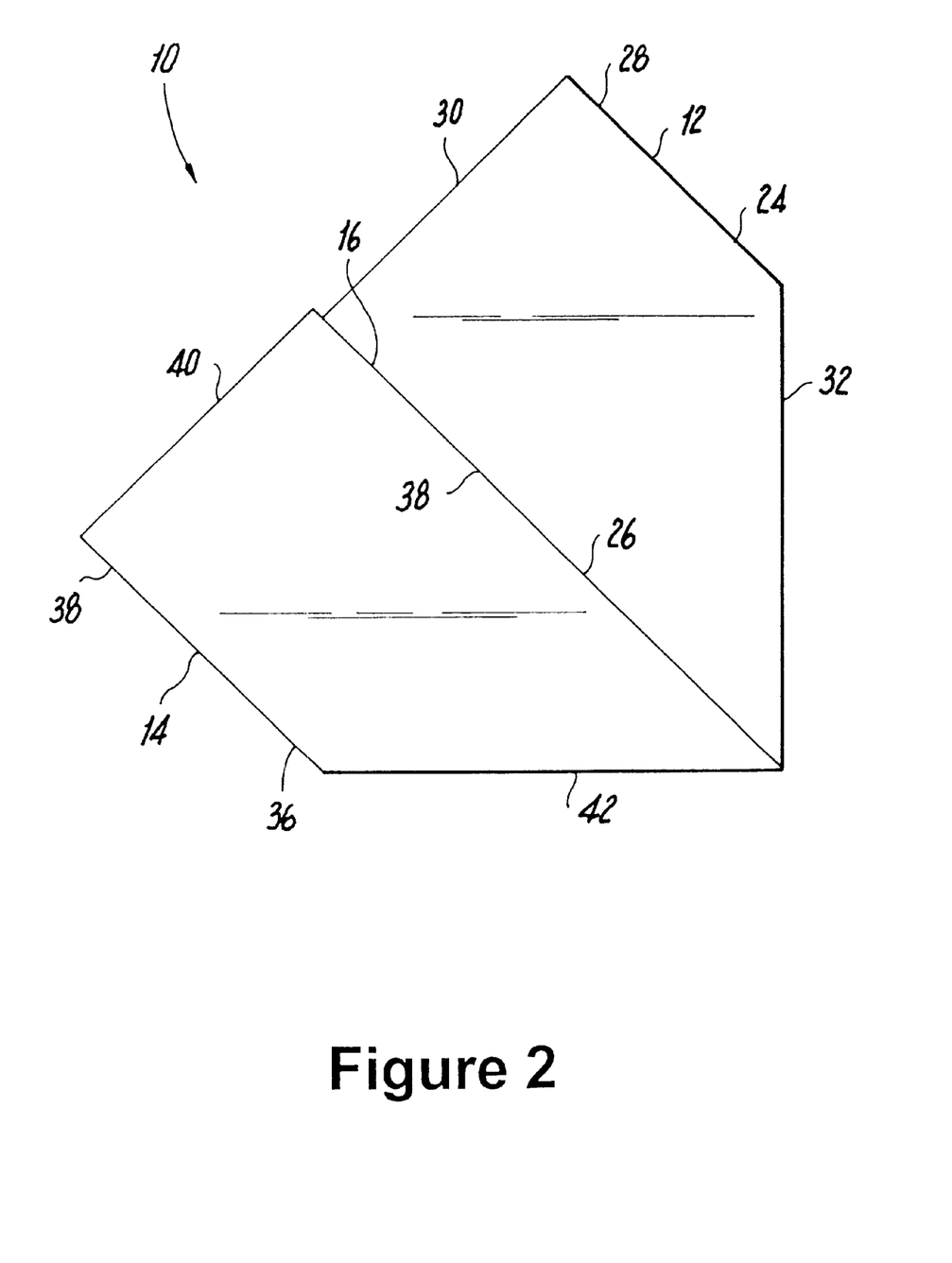
FIG. 2 is a plan view of the beam splitter shown in FIG. 1.

Referring initially to FIGS. 1 and 2, a beam splitter 10 for beam interferometry in accordance with the present invention is depicted. Referring now to FIG. 2, the beam splitter 10 includes a first prism 12, a second prism 14, and a film 16 located between the prisms 12, 14.

Referring again to FIGS. 1 and 2, the first prism 12 is defined by a first thickness 22 and a first perimeter 24 which has a first major base 26. Referring now to FIG. 2, preferably the first perimeter 24 has a trapezoidal shape and also includes a first minor base 28, a first reflecting side 30, and a first nonreflecting side 32. The first reflecting side 30 preferably forms a right angle with the first major base 26. The first nonreflecting side 32 preferably intersects the first major base 26 at a 45 degree angle.

Referring again to FIGS. 1 and 2, the second prism 14 is defined by a second thickness 34 and a second perimeter 36 which has a second major base 38. Referring now to FIG. 2, preferably the second perimeter 36 has a trapezoidal shape and also includes a second minor base 35, a second reflecting side 40, and a second nonreflecting side 42. Preferably the second reflecting side 40 forms a right angle with the second major base 38. Preferably the second nonreflecting side 40 intersects the second major base 38 at a 45 degree angle.

The first and second prisms 12, 14 are made from an optical material, e.g., synthetic fused silica. The film 16 generally includes a beam splitting coating and an optical glue for bonding the first and second prisms 12, 14 together to form a monolithic structure. The beam splitting coating preferably has a substantial ratio of 1:1 between transmissivity and reflectivity after gluing. The beam splitting coating can be applied either to the first prism 12 or the second prism 14, or to both the first and second prisms 12, 14. The surfaces of the beam splitter 10 corresponding to the first nonreflecting side 32 and the second nonreflecting side 42 are preferably coated with an anti-reflection coating such as V-coating. Preferably the first nonreflecting side 32 and the second nonreflecting side 42 are arranged to intersect at a right angle as shown in FIG. 2. Preferably the first major base 26 is shorter than the second major base 38. As shown in FIG. 1, the beam splitter 10 is preferably mounted to a housing 44 having upper and lower portions 46, 48 so that one of the trapezoidal shaped surfaces of both the first and second prisms 12, 14 is fixed to the lower portion 48.

In an alternative embodiment, the beam splitter 10 can be assembled without including glue in the film 16. Referring now to FIG. 1, the sides of the beam splitter 10 can be provided with a brace 49 to maintain the position of the first and second prisms 12, 14. The brace can be attached to the prisms 12, 14 by glue. Preferably both sides of the beam splitter 10 are restrained. As shown in FIG. 1, the brace 49 is shown in phantom and the lower portion 48 of the housing 44 can also provide restraint if the first and second prisms 12, 14 are fastened to the housing 44. A suitable method of fastening includes gluing.

Figure 3:
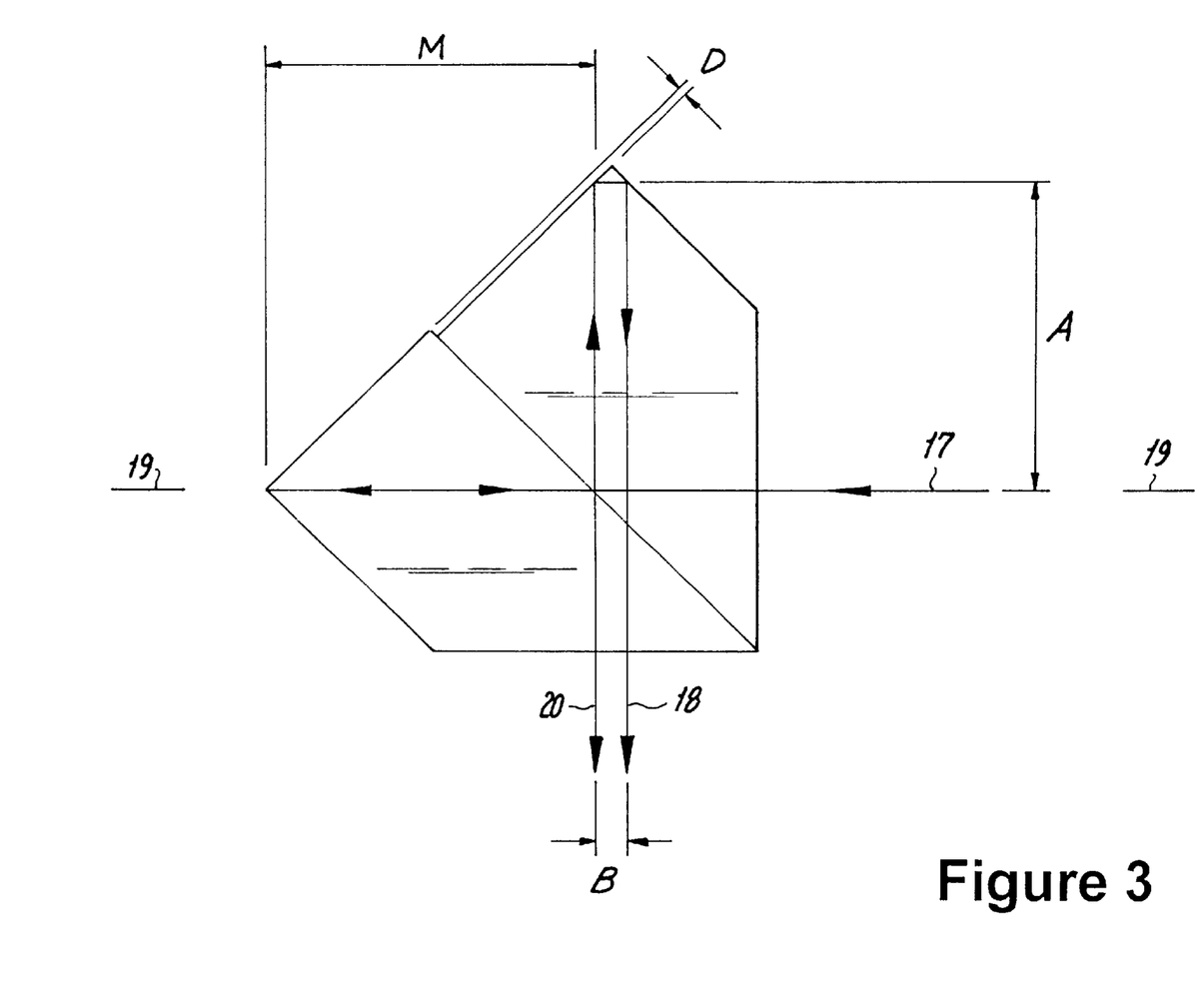
FIG. 3 is a plan view of the beam splitter shown in FIG. 1 showing an incident beam being directed at the intersection of the second major base and the second reflecting side to illustrate the preferred geometric relationship between the first and second prisms.
Figure 4:
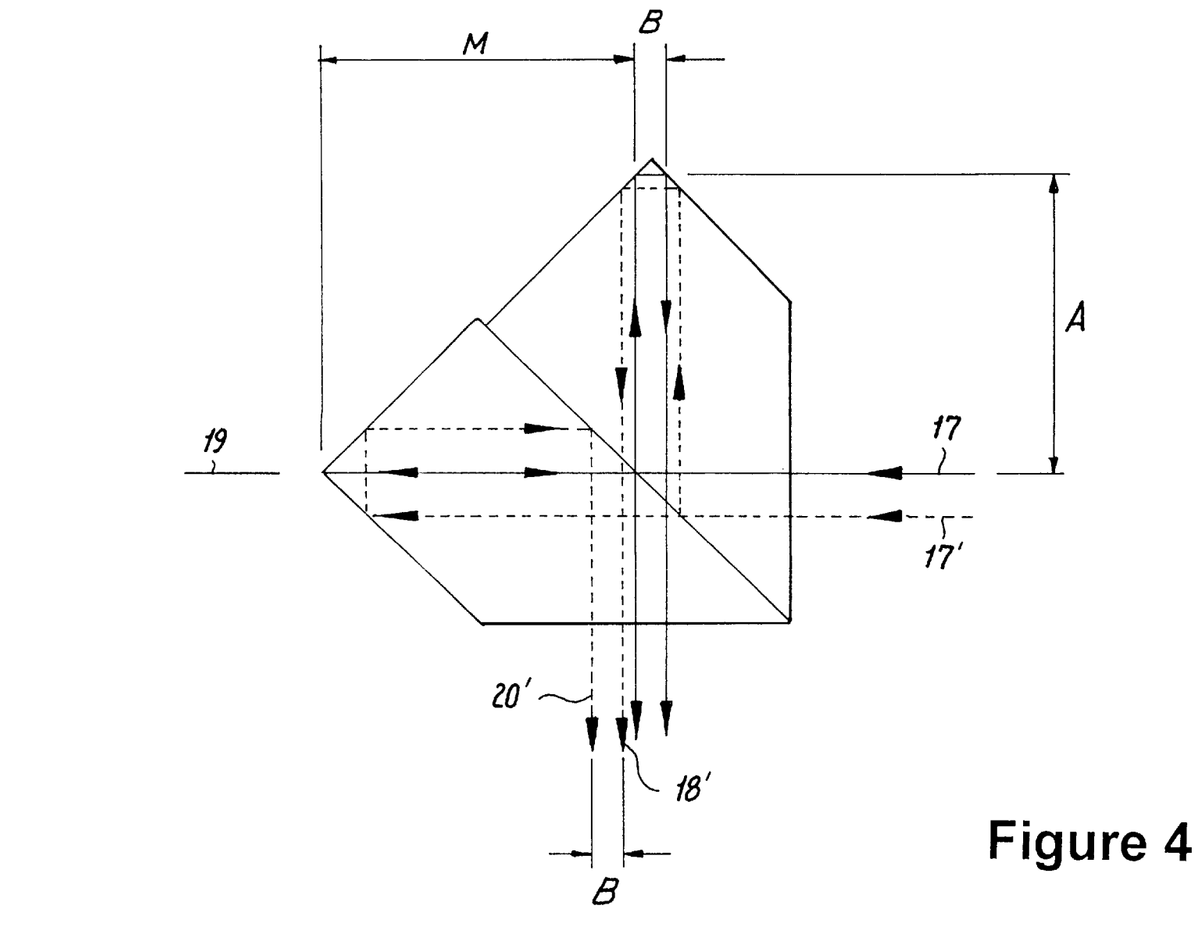
FIG. 4 is a plan view of the beam splitter shown in FIG. 1 showing an incident beam being directed at a position located below the intersection point shown in FIG. 3.

Referring to FIGS. 2, 3 and 4, the incident beam 17 is directed perpendicularly at the first nonreflecting side 32 of the beam splitter 10. The incident beam 17 splits into the first and the second beams 18, 20 at the film 16. The first beam 18 reflects within the first prism 12, passes through the film 16 and out the second nonreflecting side 42. The second beam 20 passes into and reflects within the second prism 14, reflects off the film 16 to exit through the second nonreflecting side 42. The first and second beams 18, 20 have a fixed lateral separation, and are parallel upon exiting. For the shearing interferometer application the prism 12 and 14 can relatively rotate a small angle around the major bases in order to generate a small angle between two out beams for creating the shearing fringe.

Referring to FIGS. 3 and 4, the beam splitter 10 is configured to split an incident beam so that the split beams have a equal optical path length, fixed lateral separation, and are parallel upon exiting. Referring now to FIG. 3, the geometric relationships of first and the second prisms 12, 14 of the beam splitter 10 are preferably selected to fulfill the following equation: $2A+B=2M$ with the incident beam directed at the intersection of the second minor base 35 and the second reflecting side 40. This equation is a particular condition for generating equal path length beams for the beam splitter. When using the equation it is assumed that the index of refraction for both the first and second prisms 12, 14 is the same. It is important to initially note that in this equation, B represents the fixed lateral separation for a given beam splitter 10 configuration. The left hand side of the equation $2A+B$ represents the optical path length of the first beam 18 after the incident beam 17 splits and continues to the point where the first beam 18 passes through a reference line 19 that is collinear with the incident beam 17. The right hand side of the equation $2M$ represents the optical path length of the second beam 20 after the incident beam 17 splits and continues to the point where the second beam 20 passes through the reference line 19.

In determining the geometric proportions for a particular beam splitter 10, B is generally selected upon the desired fixed lateral separation of a user. M is generally selected upon a consideration of the overall size limitations of the beam splitter which is decided by application requirement. Once B and M have been selected, A is determined from the equation. The remaining dimensions are preferably determined upon the geometry described above. The first prism dimensions are calculated from A and B. The second prism dimensions are calculated from M. Non-equation-related dimensions like the major 26, 38 and minor bases 28, 35 of the trapezoids are not fixed. The major bases 26, 38 of the first and second trapezoids can change freely without modifying the equation. Generally when using the equation to determine the dimensions of the prisms 12, 14, the thickness of the film 16 is assumed to be negligible.

It should be noted that the location of the incident beam 17 in FIG. 3 is shown for the calculation of prism geometry relationships and that it is generally not recommended that the beam 17 be directed at the intersection of the second minor base 35 and second reflecting side 40 when using the beam splitter in pencil beam interferometer. But it is possible to use for shearing interferometer.

Referring now to FIG. 3 and Table 1, an example of the geometric dimensions of a beam splitter that fulfills the above equations is tabulated for $B=1.0$ and $M=15.0$. The dimensions are in generic units.

TABLE 1

| First Prism 12 | |
|---|---|
| first major base 26 | 20.8 |
| first minor base 28 | 9.8 |
| first reflecting side 30 | 10.9 |
| Second Prism 14 | |
| second major base 38 | 21.2 |
| second minor base 35 | 10.6 |
| a second reflecting side 40 | 10.6 |

The first thickness 22 and second thickness 34 in the above example were both 10 and are not critical, but are generally preferably equal.

Referring now to FIG. 4, the optical path for the first and second beams 18', 20' in a practical application of the beam splitter 10 is shown in broken lines in contrast to those originally shown in FIG. 3 which are shown by solid lines. As noted above, the lateral separation B for a given beam splitter 10 configuration remains fixed when the incident beam 17' is directed at a different position. The optical path lengths for the first and second beams 18', 20' are equal. The path lengths are said to be "equal" even though the path lengths will never be absolutely equal due to errors introduced from various sources and phase shifts are intentionally introduced for a variety of metrology applications. Although FIG. 4 illustrates the case where the incident beam 17' is directed at a position located below the reference line 19, the path lengths of the first and second beams 18' and 20' are also equal when the incident beam 17 is directed at a position located above the reference line 19 (not shown).

In the embodiment of the present invention fulfilling the equation of 2M=2A+B the optical path lengths of two beams are in theory exactly equal; in practice there are no absolutely equal objects due to the manufacturing and positioning tolerances of the optical components. The tolerances are depended on the possibility, cost and requirements of the application. In the preferred embodiment the variation from the equal optical path length can be from microns to several millimeters mainly determined by the measurement accuracy and stability of the light source. The precise test requirement and inferior frequency stability of the light source, such as a diode laser, drive the variation to microns level or less. On the contrary, the course test requirement combined with stabilized He—Ne laser can allow a variation of only millimeters. In assembling the beam splitter 10, one way to improve the equal optical path condition and compensate for manufacturing errors is to shift the two prisms around the major bases 26, 38 which results in the slightly different separation B.

The method of generating beams in accordance with the present invention is described with reference to FIGS. 2, 3 and 4. The method includes providing a beam splitter 10 as described above and directing an incident beam 17 at the beam splitter 10. The incident beam 17 is focused at the first nonreflecting side 32 of the beam splitter 10 so that the incident beam 17 splits into first and second beams 18, 20 at the film 16. The first beam 18 reflects within the first prism 12, passes through the film 17 and out the second nonreflecting side 42. The second beam 20 reflects within the second prism 14, reflects off the film 17 to exit through the second nonreflecting side 42. The first and second beams 18, 20 have a equal optical path length, fixed lateral separation, and are parallel upon exiting.

Figure 5:
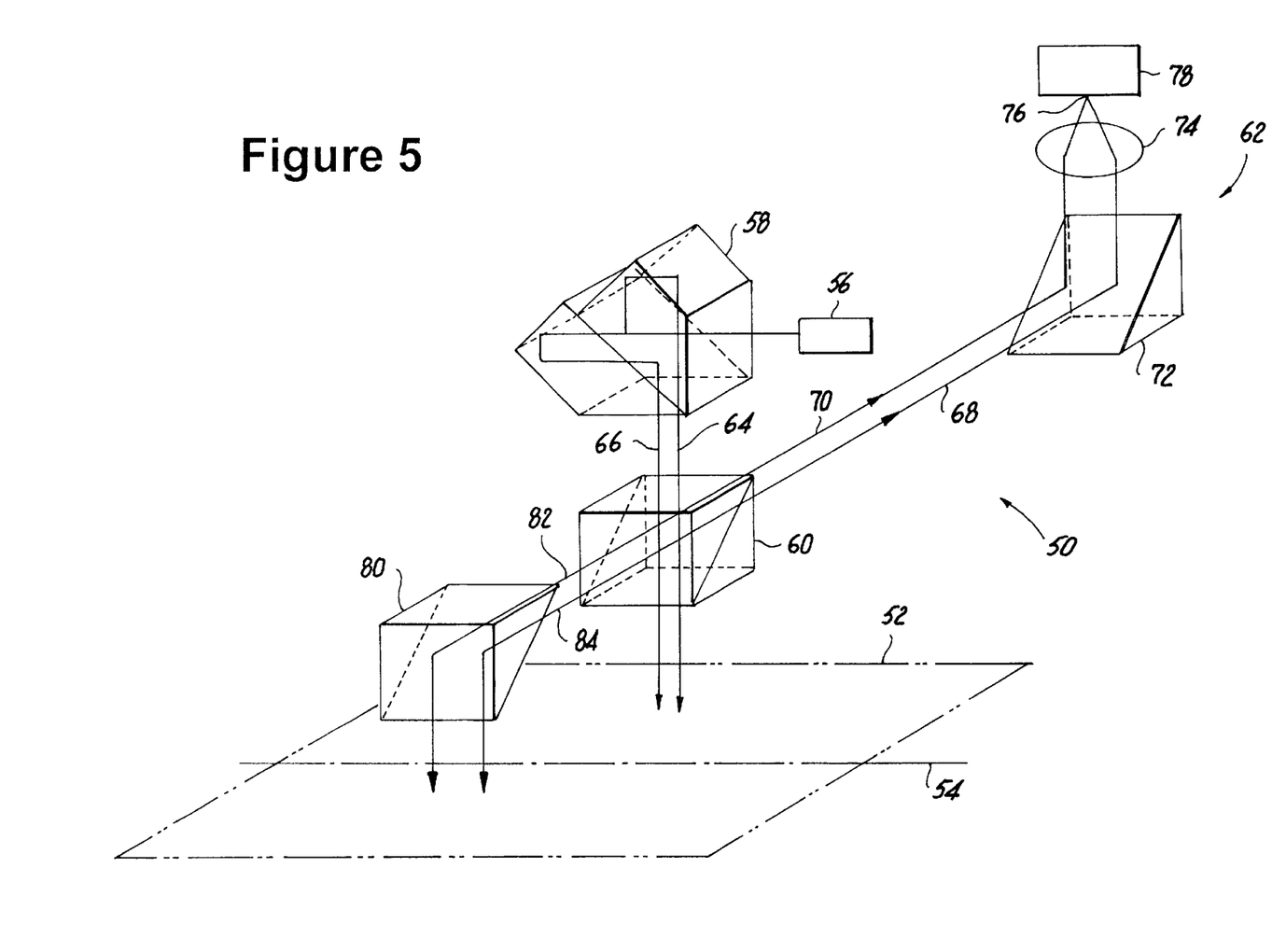
FIG. 5 is a schematic of an interferometer for measuring optical surfaces incorporating the present invention.

Referring now to FIG. 5, an interferometer 50 for profiling the surface along one axis 54 of an optical surface 52 in accordance with the present invention is shown. FIG. 5 is adopted from FIG. 1 of the inventor's prior U.S. Pat. No. 4,884,697 which has been incorporated herein by reference. The "cube beam splitter 24" and "right angle prisms 26, 28" of the '697 reference have been replaced by the beam splitter 10 in accordance with the present invention.

The interferometer 50 includes an incident light beam 56, a first beam splitter 58, a second beam splitter 60, and an image generator 62. The first beam splitter 58 includes trapezoidal shaped first and second prisms and a film located between the prisms as described above. The first beam splitter 58 is optically oriented to receive the incident light beam 56 and to generate first and second beams 64, 66 that have an equal optical path length, fixed lateral separation along the axis 54, and are parallel upon exiting with particular configuration of the beam splitter 58 of 2M=2A+B. The second beam splitter 60 receives the first and second beams 64, 66 from the first beam splitter 58 and passes the beams 64, 66 through toward the optical surface 52. The optical surface 52 is oriented to reflect the first and second beams 64, 66 back to the second beam splitter 60. The second beam splitter 60 redirects the reflected first and second beams 68, 70 toward the image generator 62 which forms the profile of the optical surface 52. Preferably the second beam splitter 60 is a cube and the incident light beam 56 is a laser beam. The image generator 62 can be configured as disclosed in the '697 patent and include a right angle prism 72 which reflects beams 68, 70 up through a Fourier transform lens 74. The image at focus 76 of the Fourier transform lens 74 is then projected onto a linear array detector 78.

Thus, while there have been described what are presently believed to be the preferred embodiments of the invention, those skilled in the art will realize that changes and modifications may be made thereto without departing from the spirit of the invention, and is intended to claim all such changes and modifications as fall within the true scope of the invention.

What is claimed is:

1. A beam splitter for splitting an incident beam into first and second beams, said beam splitter comprising:

a first prism defined by a first thickness and a first perimeter, said first perimeter having a first major base;

a second prism defined by a second thickness and a second perimeter, said second perimeter having a second major base; and a film located between said first major base and said second major base for splitting the incident beam into the first and second beams, wherein said first and second prisms are configured so that the first and second beams have a equal optical path length, fixed lateral separation and are parallel upon exiting.

2. A beam splitter as defined in claim 1 further comprising a distance M is defined as the beam path distance from said second major base to said second minor base;

a distance B defined as the fixed lateral separation;

a distance A defined as the beam path distance from said first major base to proximal said first minor base whereby 2M=2A+B.

3. A beam splitter as defined in claim 1 wherein said first beam's optical path length is equal to 2A+B;

said second beam's optical path length is equal to 2M whereby 2M=2A+B.

4. A beam splitter as defined in claim 1 wherein:

said first perimeter is trapezoidal shaped and further comprises a first minor base, a first reflecting side, and a first nonreflecting side, said first reflecting side forming a right angle with said first major base; and said second perimeter is trapezoidal shaped and further comprises a second minor base, a second reflecting side, and a second nonreflecting side, said second reflecting side forming a right angle with said second major base.

5. A beam splitter as defined in claim 4, wherein said first nonreflecting side intersects said first major base at a 45 degree angle and said second nonreflecting side intersects said second major base at a 45 degree angle.

6. A beam splitter as defined in claim 5, wherein said first nonreflecting side and said second nonreflecting side are arranged to intersect at a right angle.

7. A beam splitter as defined in claim 6, wherein said first major base is shorter than said second major base.

8. A beam splitter as defined in claim 1, wherein said film has a substantial ratio of 1:1 between transmissivity and reflectivity.

9. A beam splitter as defined in claim 1, wherein said an incident beam is directed perpendicularly at said first nonreflecting side of said beam splitter so that said incident beam splits into first and second beams at said film, said first beam reflecting within said first prism, passing through said film and to exit through said second nonreflecting side, said second beam reflecting within said second prism, reflecting off said film to exit through said second nonreflecting side, said first and second beams having a fixed lateral separation, and being parallel upon exiting.

10. A method of generating equal optical path length beams, said method comprising the steps of:

provisioning a beam splitter having:

a first prism defined by a first thickness and a first perimeter, said first perimeter being trapezoidal shaped having a first major base, a first minor base, a first reflecting side, and a first nonreflecting side, said first reflecting side forming a right angle with said first major base;

a second prism defined by a second thickness and a second perimeter, said second perimeter being trapezoidal shaped having a second major base, a second minor base, a second reflecting side, and a second nonreflecting side, said second reflecting side forming a right angle with said second major base; and a film located between said first major base and said second major base, said film having substantially ratio of 1:1 between transmissivity and reflectivity; and directing an incident beam perpendicularly at said first nonreflecting side where said incident beam splits into a first and a second beams at said film, said first beam reflecting within said first prism, passing through said film and to exit through said second nonreflecting side, said second beam reflecting within said second prism, reflecting off said film to exit through said second nonreflecting side, said first and second beams having a fixed lateral separation, and being parallel upon exiting.

11. A method as defined in claim 10, further comprising configuring said first and second prisms whereby said first and second beams have an equal optical path length upon exiting.

12. A method as defined in claim 10, further comprising configuring said beam splitter having a distance M defined as the beam path distance from said second major base to said second minor base; having a distance B defined as the fixed lateral separation; and having a distance A defined as the beam path distance from said first major base to proximal said first minor base whereby $2M=2A+B$.

13. A method as defined in claim 10, wherein said first beam's optical path length is equal to $2A+B$; said second beam's optical path length is equal to $2M$; whereby $2M=2A+B$.

14. A method as defined in claim 10, wherein said second beam is perpendicular to said nonreflecting side of said second trapezoid.

15. A method as defined in claim 10, wherein said first beam is said perpendicular to said nonreflecting side of said second trapezoid.

* * * * *